United States Patent
Gabrielson

(10) Patent No.: US 11,196,639 B1
(45) Date of Patent: Dec. 7, 2021

(54) HIGH-AVAILABILITY FRAMEWORK FOR SERVICES IN PROVIDER NETWORK ENVIRONMENTS

(71) Applicant: Amazon Technologies, Inc., Seattle, WA (US)

(72) Inventor: Jacob Adam Gabrielson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 674 days.

(21) Appl. No.: 15/831,012

(22) Filed: Dec. 4, 2017

(51) Int. Cl.
*H04L 12/24* (2006.01)
*H04L 12/16* (2006.01)
*H04L 12/26* (2006.01)

(52) U.S. Cl.
CPC .......... *H04L 41/20* (2013.01); *H04L 41/5025* (2013.01); *H04L 43/062* (2013.01); *H04L 43/14* (2013.01)

(58) Field of Classification Search
None
See application file for complete search history.

(56) References Cited

U.S. PATENT DOCUMENTS

| | | | |
|---|---|---|---|
| 7,496,661 B1* | 2/2009 | Morford | H04L 41/5025 709/224 |
| 8,606,938 B1* | 12/2013 | Chong | H04L 41/0659 709/228 |
| 9,451,393 B1* | 9/2016 | Cullen | H04W 4/50 |
| 9,553,925 B2* | 1/2017 | Fausak | H04L 67/28 |
| 10,567,252 B1* | 2/2020 | Mukhopadhyaya | H04L 41/22 |
| 2005/0005271 A1* | 1/2005 | Clymer | H04L 41/5016 718/1 |
| 2013/0144946 A1* | 6/2013 | Subramanian | H04L 41/5009 709/204 |
| 2014/0122143 A1* | 5/2014 | Fletcher | G06Q 10/0631 705/7.14 |
| 2015/0156081 A1* | 6/2015 | Chakra | H04L 41/5006 709/224 |
| 2016/0156527 A1* | 6/2016 | Ha | H04L 41/5003 709/202 |
| 2016/0380911 A1* | 12/2016 | Bhandaru | G06F 9/5072 709/226 |
| 2018/0069948 A1* | 3/2018 | Blank | H04L 67/36 |

* cited by examiner

*Primary Examiner* — Lance Leonard Barry
*Assistant Examiner* — Mohammad Yousuf A. Mian
(74) *Attorney, Agent, or Firm* — Robert C. Kowert; Kowert, Hood, Munyon, Rankin & Goetzel, P.C.

(57) ABSTRACT

A high-availability (HA) framework for services deployed in provider network environments. Services may be deployed as machine images or containers to a provider network. The HA framework provides a "wrapper" around the deployed services that provides feedback loops and flow control for inbound and outbound communications to other services on the provider network or to other external entities. The HA framework intercepts inbound and outbound traffic to the service, and may automatically determine, configure, and adjust networking management aspects such as timeouts, flow control, etc. for the service. The HA framework may also intercept outbound traffic to monitor outbound connections to other services to determine if the services satisfy HA requirements of the service.

20 Claims, 13 Drawing Sheets

US 11,196,639 B1

HIGH-AVAILABILITY FRAMEWORK FOR SERVICES IN PROVIDER NETWORK ENVIRONMENTS

BACKGROUND

Many companies and other organizations operate computer networks that interconnect numerous computer systems to support their operations, such as with the computer systems being co-located (e.g., as part of a local network) or instead located in multiple distinct geographical locations (e.g., connected via one or more private or public intermediate networks). For example, data centers housing significant numbers of interconnected computer systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Figure 1:
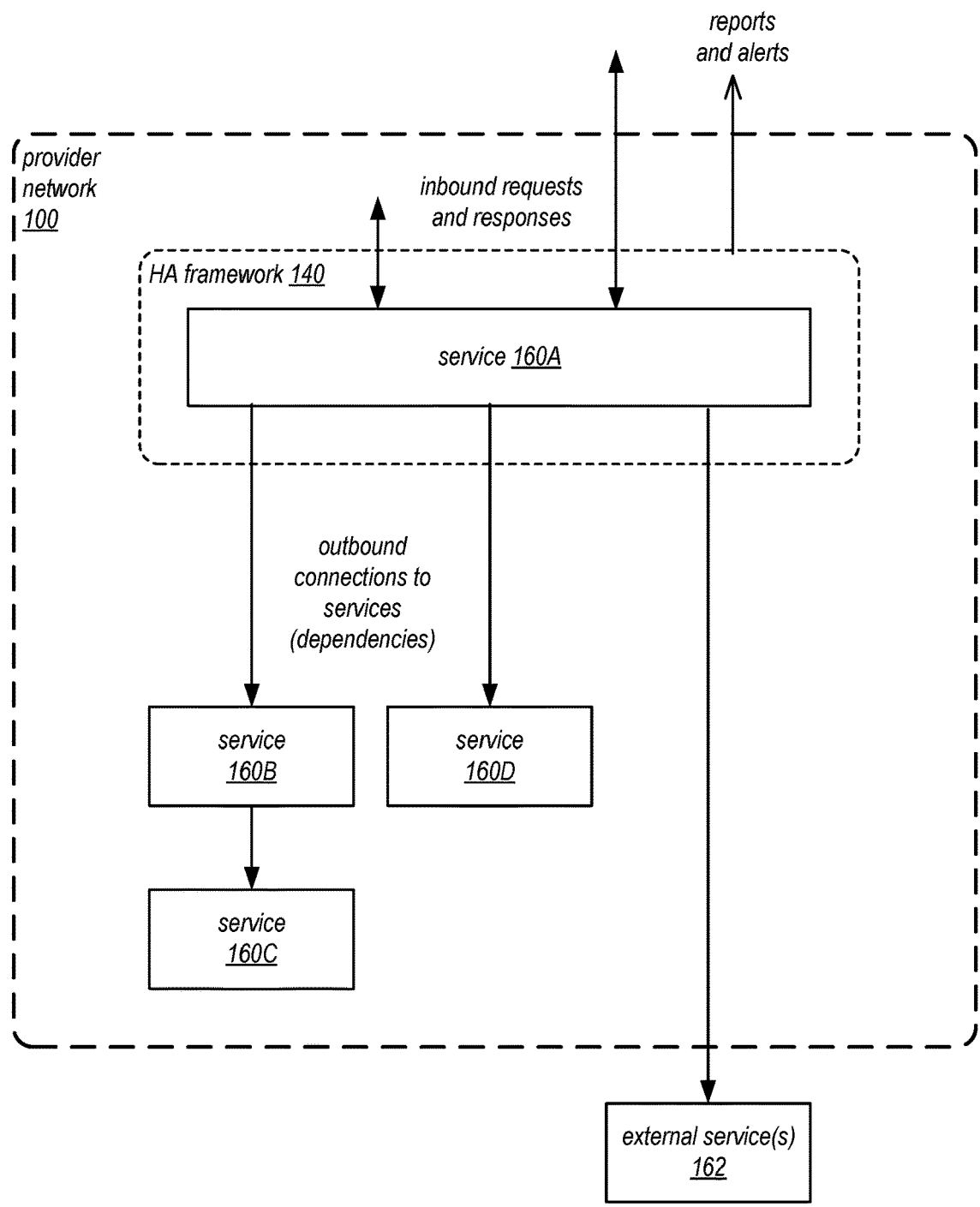
FIG. 1 is a high-level block diagram illustrating a high-availability (HA) framework for services in provider network environments, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing a high-availability (HA) framework for deploying services in provider network environments are described. Service developers may deploy their services as machine images or containers to host devices on the provider network. The HA framework provides a "wrapper" around the deployed services that provides feedback loops and flow control for inbound and outbound communications over the provider network to other services on the provider network or to other external entities. The HA framework intercepts, monitors, controls, and collects statistics on inbound and outbound network traffic (IP packets) to the service, and may automatically determine, configure, and adjust networking management aspects such as timeouts, flow control, etc. for the service based at least in part on the statistics. In some embodiments, the HA framework may also determine whether additional instances of a service need to be launched, or whether one or more instances of a service can be removed, based at least in part on the statistics. The HA framework may also intercept outbound network traffic to monitor outbound connections to other services to determine if the services (as well as other services that those services may depend on) satisfy or violate HA requirements of the service. The HA requirements for a service may, for example, be expressed as a percentage of time over a period (e.g., one year) that the service is intended to be available (referred to as an availability level), and may also be referred to as "uptime". For example, a service may have an intended (or target) availability level of 99.9999%, also referred to as "six nines" availability. The HA framework may also track availability and health of services on the provider network over time to determine the services' actual availability levels. Note that a service's actual availability level may differ from its target availability level. The actual availability levels and health information for the services may, for example, be used in determining if outbound connections from a service to other services satisfy or violate HA requirements of a service, and may also be reported to appropriate entities such as service developers.

In some embodiments, a service may be replicated in two or more availability zones of the provider network, thus helping to maintain the HA requirements of the service. If one availability zone goes down, the service should be available in the other availability zones. Replicated services may sometimes share data between respective availability zones, for example via low-latency links between the availability zones. By monitoring and controlling all inbound network traffic to and outbound network traffic from the service, the HA framework may serve as a buffer between copies of a service that is replicated across two or more availability zones, and may help to maintain independence of the copies in the different availability zones, thus helping to ensure that if one availability zone goes down, the service does not go down and is not adversely affected in the other availability zones.

Embodiments of the HA framework may thus provide feedback loops and flow control for network communications, provide a framework for monitoring and maintaining HA requirements, and provide a framework for maintaining availability zone independence to services on the provider network. Service developers simply generate their services as machine images or containers with minimal requirements (e.g., receiving inbound network packets on a specified port and sending outbound network packets to a specified address range), and deploy the machine images or containers to the HA framework on the provider network. Other than the minimal requirements, the service providers are free to code their services in any way that they want.

High Availability Services

Service developers may desire to provide (and advertise) their services to customers (e.g., external users, other services on the provider network, etc.) at some level of availability. Periods when a service is available are referred to as "uptime", and periods when a service is unavailable are referred to as "downtime". A service may be referred to as having high availability if the service developer can ensure higher than normal uptime, or conversely lower than normal downtime. Typically, availability is expressed as a percentage of (guaranteed) uptime over a period of time (e.g., one year). An availability percentage may be referred to by the number of nines in its digits. The following are a few examples:

| Availability % | | Downtime per year |
| --- | --- | --- |
| 99.9 | ("three nines") | 8.76 hours |
| 99.99 | ("four nines") | 52.56 minutes |
| 99.999 | ("five nines") | 5.26 minutes |
| 99.9999 | ("six nines") | 31.5 seconds |
| 99.99999 | ("seven nines") | 3.15 seconds |

However, distributed systems (e.g., services deployed on a provider network) may fail due to the lack of effective feedback loops, in particular feedback loops for communications over a network in a distributed system. For example, a service outage may occur because two services that interact with each other do not have any effective flow-control for network communications between the services. As a result, when one service slows down, the other service may experience various problems such as filling up all its connection/thread pools on every machine, which may take the entire service down. However, effective feedback loops are complicated and difficult for software engineers to develop. Basic support for feedback loops could be provided in the form of a software library or environment; however, this approach tends to limit the creativity of software developers. For example, a software team developing a service using the software library may be required to use a specific programming language, and/or to use a particular asynchronous concurrency framework that is not compatible with other software they want to use. Further, in a large organization, it is difficult for software development managers to determine whether or not various software teams have exposed their code to potential problems that may be caused by missing or improper feedback loops.

Another problem in providing high-availability services is that a service may have interactions with and thus dependencies on other services, which in turn may have their own interactions with and dependencies on other services. A service that communicates with and depends on another service for some of its functionality may experience problems or even go down if the other service is experiencing problem or goes down. Thus, if a service developer wants their service to provide high availability, for example "five nines" availability, and wants to advertise the service at that level of availability, then any services that the service connect to and depends on, and recursively any other services that those services connect to and depend on, should have at least that level of availability. However, it is difficult if not impossible for service developers to accurately assess the availability levels of other services that their services may interact with, especially considering that those other services may themselves interact with other services, and so on.

Another concern in providing high-availability services is in maintaining independence of replicated services. In some embodiments, a service may be replicated in two or more availability zones or data centers of the provider network. By replicating a service across the availability zones, the service may remain available in another availability zone if one availability zone (or the service implementation in that availability zone) goes down for some reason, thus helping to maintain the HA requirements of the service. An important aspect of availability zones is maintaining availability zone independence—if one availability zone goes down, the other availability zones (and replicated services within those availability zones) should not go down or be adversely affected as a result. However, replicated services may sometimes share data between respective availability zones, for example via low-latency links between the availability zones. It is difficult for service developers to develop their services so that replicas of the service both maintain independence across availability zones and share data across availability zones.

High Availability Framework for Services

FIG. 1 is a high-level block diagram illustrating an HA framework for services in provider network environments, according to some embodiments. An HA framework 140 is provided in which service developers can deploy a service 160 (e.g., service 160A) on a provider network 100. The HA framework 140 may intercept and control all inbound and outbound network traffic of a service 160A that is deployed in the HA framework 140. The HA framework 140 may automatically determine, configure, and adjust networking management aspects such as timeouts, flow control, etc. for a service 160A based at least in part on inbound and outbound traffic statistics, thus providing feedback loops for communications over the network 100. In some embodiments, the HA framework 140 may also determine whether additional instances of a service 160A need to be launched, or whether one or more instances of a service 160A can be removed, based at least in part on inbound and outbound traffic statistics. The HA framework 140 may monitor connections to other services 160 on the provider network 100 (e.g., services 160B and 160D) to determine if the services 160 (as well as other services such as 160C that those services 160 may depend on) satisfy or violate HA requirements of the service 160A. In some embodiments, the HA framework 140 may also monitor connections to services 162 external to the provider network 100 to determine if the external services 162 satisfy or violate HA requirements of the service 160A. The HA framework 140 may also track availability and health of services 160 and 162 over time; availability and health information for the services may, for example, be used in determining if outbound connections to other services satisfy or violate HA requirements of a service 160A, and may also be reported to interested parties such as service developers.

Embodiments of the HA framework may leverage virtualization technology that allows services to be developed as machine images or containers that can be deployed to and executed in virtualization environments provided by platform virtualization software on host devices of a provider network. A machine image (MI) is a type of virtual appliance that is used to create a virtual machine (VM) that executes as a service in a virtualization environment on a host device of the provider network. A component of an MI is a read-only filesystem image that includes an operating system (OS) and any additional software required to deliver a service. A container is a stand-alone executable package that executes in a virtualization environment on a host device and that includes everything needed to execute a service in the virtualization environment: e.g., code, runtime, system tools, system libraries, and settings. A primary difference between containers and MIs/VMs is that containers provide a way to virtualize an OS in order for multiple workloads to run on a single OS instance, whereas with VMs, the hardware is virtualized to run multiple OS instances. In this document, containers are generally described as the virtualization technology leveraged by the HA framework; however, MIs may also be developed and deployed in the HA framework. More generally, other types of virtual appliances or virtualized software may also be developed and deployed in the HA framework.

In some embodiments, to use the HA framework, the service developer configures the container according to requirements of the HA framework so that:

the service (e.g., via a webserver configured in the container) listens for inbound requests on a specified port (e.g., port 8080); and the service uses only link-local (RFC 3927) IP addresses for explicit network communications (e.g., connections to other services on the provider network). For example, the service may be required to use IP addresses within the 169.254.0.0/16 range.

In some embodiments, the container may also be required to provide health metrics when requested on a different specified port (e.g., port 2000). Other than these requirements, the service developer can configure the container in any way they want, using any framework, programming language, OS, or OS features that they want or need to use. The container may then be deployed to one or more host devices to execute in the HA framework on the provider network.

In some embodiments, the service may be allowed to use any IP addresses for explicit network communications (e.g., connections to other services on the provider network). However, all network communications are intercepted by a proxy layer of the HA framework, which performs any necessary domain name/address lookup, mapping, or translation in performing the functions of the HA framework.

Figure 2:
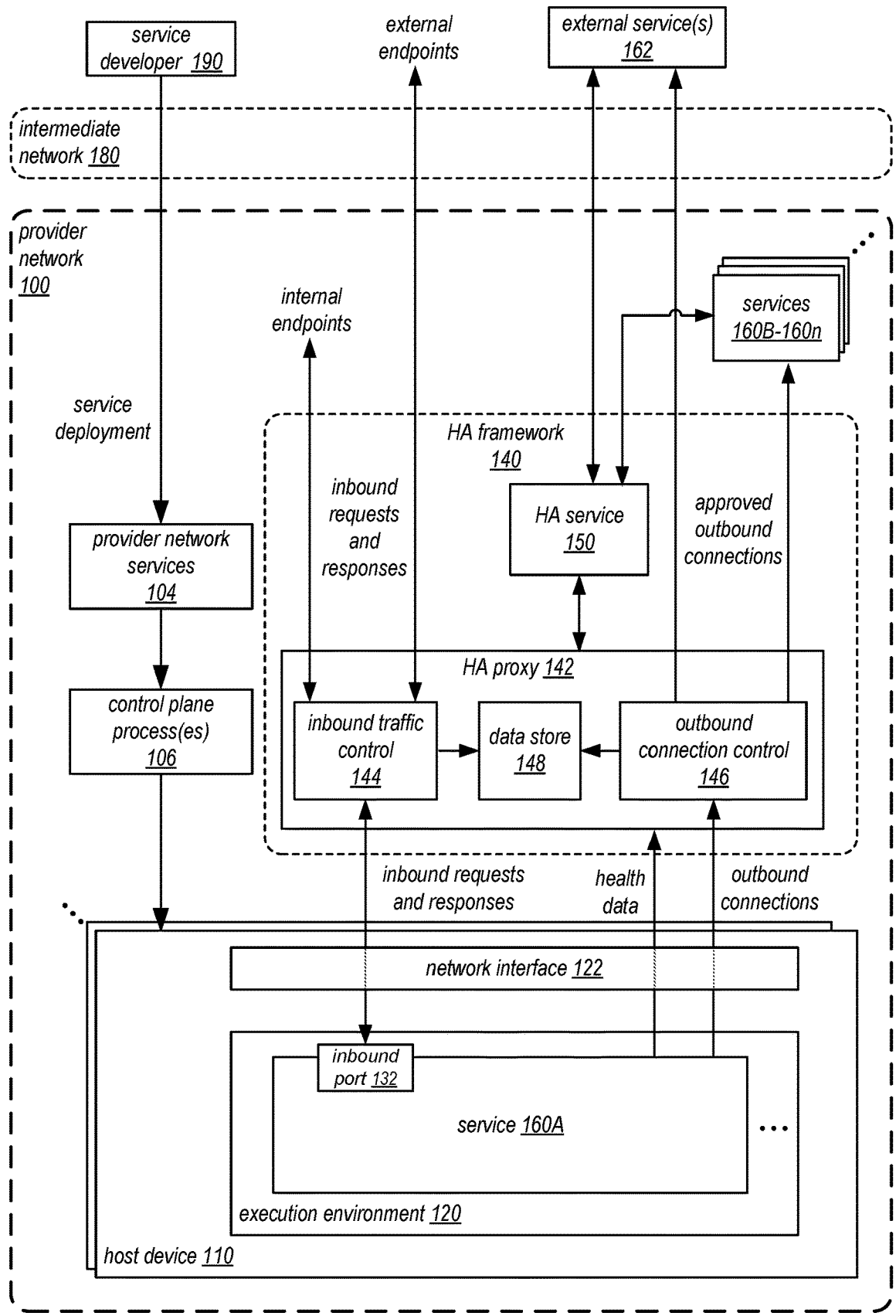
FIG. 2 is a block diagram illustrating components and operations of an HA framework for services in a provider network, according to some embodiments.

In some embodiments, the service developer may provide information about the container/service. The information may include one or more of, but is not limited to, a name for the service, an initial estimate of the availability level (e.g., five nines) for the service, HA requirements for the service (e.g., a target availability level (e.g., five nines) over a period of time that the service developer wants the service to provide), a list of other services that the service is allowed to communicate with, a list of other services that the service is not allowed to communicate with, the number of instances of the service to be deployed, and availability zones for the service (see, e.g., FIG. 4). The container and information may be provided through an application programming interface (API) to a provider network service, for example as illustrated in FIG. 2.

The HA framework provides a "wrapper" or proxy layer around the deployed service that provides feedback loops and flow control for inbound and outbound communications over the provider network to other services on the provider network or to other external entities. The proxy layer intercepts inbound network traffic to and outbound network traffic from the service, and may automatically determine, configure, and adjust networking management aspects such as timeouts, flow control, etc. for the service. The proxy layer may intercept outbound network traffic (e.g., IP packets) on the link-local addresses, and may monitor outbound connections to other services to determine if the target services (as well as other services that those target services connect to and depend on) satisfy or violate HA requirements of the requesting service.

As indicated above, the HA requirements for a service may be specified by the service developer. For example, the HA requirements may be specified as a target availability level (e.g., five nines, six nines, etc.) over a period of time (e.g., one year, one month, etc.) that the service developer wants the service to provide. Different target availability levels and different time periods may be specified, for example five nines over 12 months, six nines over 12 hours, etc. In some embodiments, to determine if a target service satisfies or violates the HA requirements of the requesting service, the HA framework compares the availability level of the target service to the target availability level of the requesting service. The availability level of the target service may be provided by the owner of that service, or alternatively may be determined by the HA framework based on actual uptime/downtime of the target service over time. For example, if the target availability level of the requesting service as specified by the service developer is five nines over 12 months, and the HA framework determines that the target service's availability level is six nines over 12 months, then a connection to the target service may be allowed. As another example, if the target availability level of the requesting service as specified by the service developer is six nines over 12 months, and the HA framework determines that the target service's availability level is four nines over 12 months, then a connection to the target service may be (but is not necessarily) disallowed.

While the above provides an example in which the HA requirements are specified as a target availability level (e.g., five nines), other methods may be used to specify HA requirements. For example, in some embodiments, a service developer may simply specify that their service is to be "HA." Other services may be rated as "HA" or "not HA". To determine if a target service satisfies or violates the HA requirements of the requesting service, the HA framework simply checks if the target service is rated "HA" or "not HA."

In some embodiments, the service developer may provide a list of services that the service is allowed to connect to, and/or a list of services that the service is not allowed to connect to (or, alternatively, one list that indicates allowed and disallowed services). In some embodiments, the service is allowed to connect to services on the "allowed" list regardless of the services' availability levels, and is not allowed to connect to services on the "disallowed" list regardless of the services' availability levels.

FIG. 2 is a block diagram illustrating components and operations of an HA framework for services in a provider network, according to some embodiments. FIG. 2 shows an example provider network 100 environment in which an HA framework 140 for services 160 may be implemented. In some embodiments, the HA framework 140 may include, but is not limited to, a proxy layer in which HA proxies 142 are implemented, and a centralized HA service 150.

Figure 13:
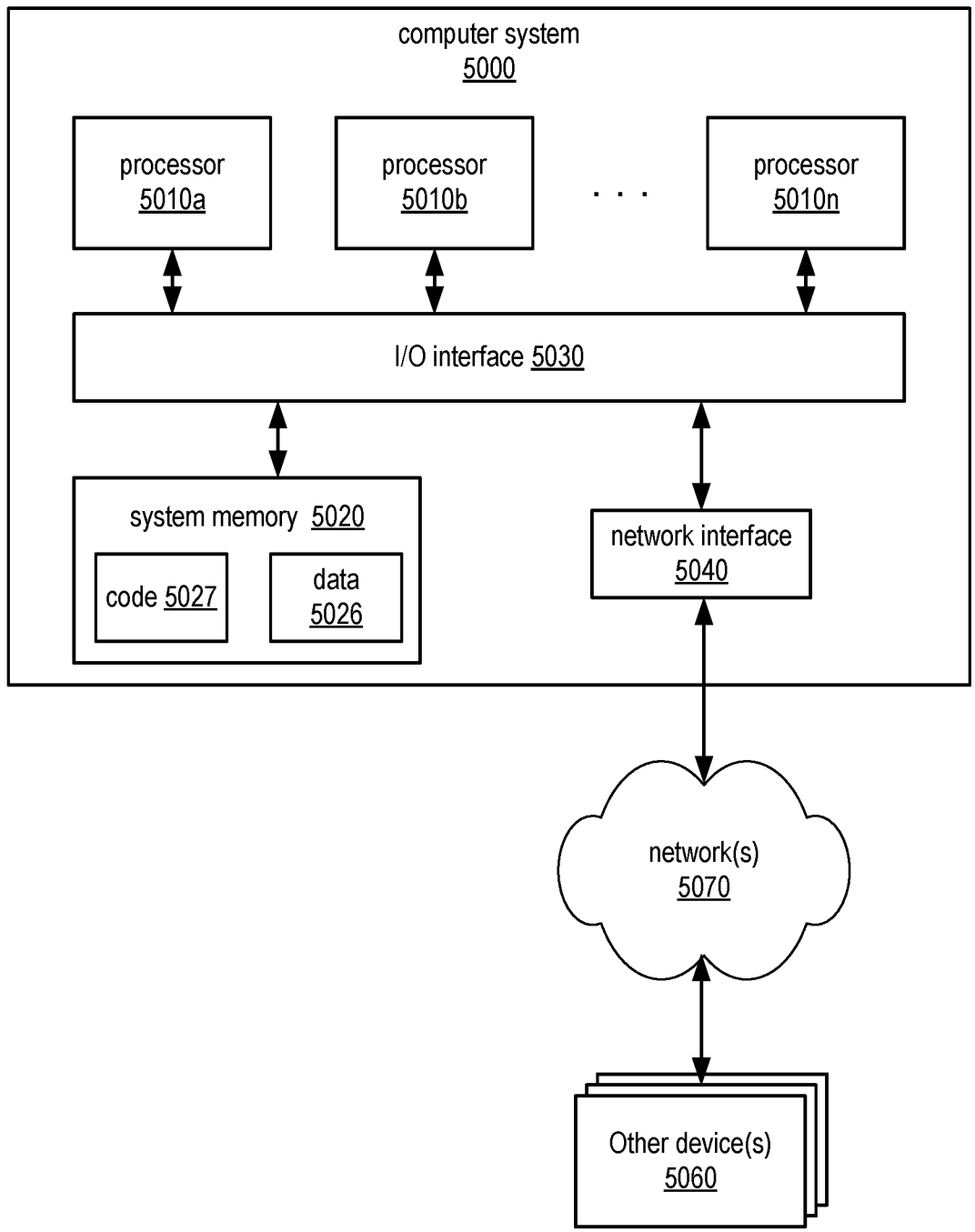
FIG. 13 is a block diagram illustrating an example computer system that may be used in some embodiments.

In at least some embodiments of a provider network 100, at least some of the resources provided via the provider network 100 may be virtualized computing resources executed on multi-tenant hardware (e.g., host devices 110). A host device 110 may be a computing device on the provider network 100 that includes hardware virtualization technology (hardware and software), referred to as execution environment 120, in which services 160 (e.g., service 160A) may execute (e.g., as machine images or containers). In some embodiments, the host device 110 may also include a network interface 122 through which traffic from a service 160A to the provider network 100 and from the provider network 110 to the service 160A passes. Host device 110 may, for example, be a rack-mount server, a blade server, a stand-alone server, or a system on a chip (SoC). An example computer system that may be used as a host device 110 is illustrated in FIG. 13. The execution environment 120 provided by the host device 110 includes hardware components (e.g., processors, memory, storage space, network interfaces, etc.) and software components (e.g., operating system, platform virtualization software that provides virtual environments for launching and executing machine images or containers, etc.) of the host device 110 in which service(s) 160 execute. The execution environment 120 provides hardware and software resources (e.g., computation (e.g., processor) resources, memory space, storage (e.g., disk) space, networking (e.g., network bandwidth or throughput) resources, multithreading resources, etc.) that may be used by the service(s) 160 when executing on the host device 110. The service(s) 160 on a host device 110 may be provisioned with a given amount of resources (memory space, storage (e.g., disk) space, computation (e.g., CPU) resources etc.) on the respective host device 110. In some embodiments, each service 160 on a host device 110 may be provisioned with the same amount of resources of the host device 110. In some embodiments, however, different services 160 on a host device 110 may be provisioned with different amounts of the various resources of the host 110.

The provider network 100 may provide one or more provider network services 104 implemented by one or more computing devices on the provider network 100 that provide APIs via which a service developer 190 may deploy, via an intermediate network 170 such as the Internet, a machine image or container for their service implementation. In some embodiments, the service developer 190 may provide information about the service 160. The information may include one or more of, but is not limited to, a name for the service 160, an initial estimate of the availability level (e.g., five nines) for the service 160, HA requirements for the service 160 (e.g., a target availability level (e.g., five nines) that the service developer 190 wants the service 160 to provide), a list of other services that the service 160 is allowed to communicate with, a list of other services that the service 160 is not allowed to communicate with, the number of instances of the service 160 to be deployed on the provider network 100, and availability zones for the service 160 (see, e.g., FIG. 4).

Once the deployment of the machine image or container is approved and one or more suitable host devices 110 for the deployment are identified, the machine image or container may be installed as a service 160 (e.g., service 160A) on a host device 110 by a control plane process 106 of the provider network 100. In some embodiments, multiple instances of a service 160A may be deployed to one or more host devices 110 of the provider network 100.

In some embodiments, the HA framework 140 may include a proxy layer in which an HA proxy 142 for the service 160A is instantiated. The HA proxy 142 is instantiated in the network path of the service 160A. All inbound and outbound traffic for the service 160A passes through the HA proxy 142. In some embodiments, the HA proxy 142 may be implemented in the execution environment 120 of the host device 110 in which the service 160A executes. In some embodiments, the HA proxy 142 may be implemented in the network interface 122 of the host device 110 in which the service 160A executes. In some embodiments, the HA proxy 142 may be implemented on a device external to the host device 110 in which the service 160A executes. In some embodiments, two or more services 160, or two or more instances of a service 160, may be instantiated on a host device 110. In some embodiments, two or more services 160 or service instances may share a common HA proxy 142, or alternatively one or more of the services 160 or service instances may each have a dedicated HA proxy 142.

In some embodiments, the HA proxy 142 may include, but is not limited to, an inbound traffic control 144 module and an outbound connection control 146 module. The HA proxy 142 may also include or have access to a data store 148 to which the modules 144 and 146 may store statistics for inbound and outbound traffic for a service 160A. Information for monitoring and controlling inbound traffic and outbound connections may also be stored in and read from the data store 148, for example a list of other services that the service 160A is allowed to connect to and communicate with, a list of other services that the service 160A is not allowed to communicate with, a list of services that are (or are not) HA-compliant along with their current availability level (e.g., 99.999, or "five nines", etc.), information on current connections to other services (e.g., mappings from the actual IP addresses of the services to IP addresses that are provided to the service 160A for the connection), etc. Information about the target availability level and actual availability level of the service 160A may also be maintained in the data store 148. In some embodiments, other information may be stored in the data store 148, for example health data obtained from the service 160A.

All inbound requests to the service 160A are intercepted by the inbound traffic control 144 module of the HA proxy 142, which forwards the requests to a designated inbound port 132 (e.g., port 8080) of service 160A. The inbound requests may originate from endpoints on the provider network 100 or from endpoints external to the provider network 100. The service 160A sends responses to the requests through port 132; the responses are intercepted by inbound traffic control 144, which sends the responses on to the provider network 100 to be routed to respective endpoints. In some embodiments, responses to the requests may be sent from service 160A via port 132, intercepted by inbound traffic control 144, and forwarded to respective internal or external endpoints.

Inbound traffic control 144 may also collect and store statistics on inbound requests to and responses from the service 160A. The statistics may be stored in data store 148. In some embodiments, the statistics may be used to automatically determine, configure, and adjust networking management aspects such as timeouts, flow control, etc. for inbound traffic to the service 160A. In some embodiments, the statistics may be sent to an HA service 150 of the HA framework 140 that may, for example, utilize machine learning or other technologies to determine the networking management aspects for the service 160A based at least in part on the statistics.

A service 160A may attempt to establish outbound connections to other services. The other services may include one or more of services 160B-160*n* instantiated on the provider network 100. In some embodiments, the other services may also include one or more services 162 external to the provider network 100, for example services in a network or data center of the service developer 190 who owns service 160A, or services in other provider networks. In some embodiments, an external service 162 may, for example, be connected to a service 160 on provider network 100 via a direct connection or VPN connection over intermediate network 180. In some embodiments, all outbound connections to the other services from the service 160A are intercepted by the outbound traffic control 146 module of the HA proxy 142. In some embodiments, the service 160A sends connection requests to other services (referred to as target services) to link-local (RFC 3927) IP addresses. For example, the service 160A may use IP addresses within the 169.254.0.0/16 range. The outbound traffic control 146 module of the HA proxy 142 intercepts packets sent by the service 160A to the outbound IP addresses. In some embodiments, the service 160A includes an indication of the target service that the service 160A wants to connect to and communicate with in the connection requests. The indication of the target service may, for example, be a known domain name (e.g., "CATALOG SERVICE").

Outbound traffic control 146 may then determine whether the target service satisfies or violates the HA requirements of the requesting service 160A. In some embodiments, outbound traffic control 146 may look up the domain name of the target service in a locally stored list of services that the service 160 is allowed to communicate with to determine if the service 160A is allowed to connect to the target service. In some embodiments, outbound traffic control 146 may look up the domain name of the target service in a locally stored list of services that the service 160A is not allowed to communicate with to determine if the service 160A is allowed to connect to the target service. In some embodiments, outbound traffic control 146 may obtain a current availability level for the target service; the availability level of the target service may then be compared to a target availability level of the service 160A to determine if the service 160A is allowed to connect to the target service.

In some embodiments, instead of looking up the domain name of the target service in a locally stored list of services, or in cases that the domain name of the target service is not in the locally stored list of services, outbound traffic control 146 may query the centralized HA service 150 to determine whether the target service satisfies or violates the HA requirements of the requesting service 160A. The HA service 150 may maintain a database of services that includes current availability levels and health information for the services. The HA service 150 may look up the service's domain name in the database and return availability information to the outbound traffic control 146 module of the HA proxy 142, which may then make a decision on whether to allow the connection based at least in part on the availability information.

In some embodiments, if the availability level of the target service is at or above the target availability level of the service 160A, then the target service satisfies the HA requirements of the requesting service 160A. Otherwise, the service does not meet the HA requirements of the requesting service 160A. In some embodiments, to determine whether a target service meets the HA requirements of the service 160A, the availability level of one or more other services that the target service depends on may also be evaluated. If the current availability level of any of the other services does not satisfy the target availability level of the service 160A, then the target service does not meet the HA requirements of the requesting service 160A even if the availability level of the target service does.

Upon determining that the target service satisfies the HA requirements of the requesting service 160A, then the connection to the target service from the service 160 may be allowed. Upon determining that the target service does not satisfy the HA requirements of the requesting service 160A, different actions may be taken. For example, the connection to the target service may be allowed or disallowed based on preferences specified by the service developer 190 and/or on the current status of the service 160A (e.g., whether the service 160A is in a deployment test phase or in production). In some embodiments, an alert message may be sent to the service developer 190 indicating that the service 160A has attempted to connect to a target service that does not meet the HA requirements of the service 160A. In some embodiments, the service developer 190 may then make a determination as to whether the connection should be allowed.

In some embodiment, upon determining that a connection is allowed to a target service that does not satisfy the HA requirements of the requesting service 160A, then the availability level of the service 160A may be downgraded by the HA framework 140 to indicate the new (lower) level for the service 160A. For example, if a service 160 that has an availability level of 99.9999 (six nines) is allowed to connect to another service that has an availability level of 99.999 (five nines), then the availability level of the service 160 may be downgraded to 99.999 (five nines).

Upon determining that the connection to the target service is allowed, outbound traffic control 146 may determine the IP address of the target service. In some embodiments, outbound traffic control 146 may look up the domain name of the target service to obtain an IP address for the service (e.g., an IP address of a load balancer that fronts the service). In some embodiments, the HA framework 140 may provide DNS-like functionality that outbound traffic control 146 may use to look up the domain name and obtain the IP address of the target service. Alternatively, the connection request may go to an external DNS of the provider network 100; the response from the external DNS is intercepted by outbound traffic control 146. Outbound traffic control 146 may then return a local IP address for the connection to the service 160A. The local IP address provided to the service 160A is mapped to the IP address of the target service, and the mapping is locally stored by outbound traffic control 146. Traffic from the service 160A on the connection is intercepted by outbound traffic control 146, which forwards the traffic to the IP address of the target service. Traffic from the target service on the connection is intercepted by outbound traffic control 146, which forwards the traffic to the local IP address provided to service 160A.

Outbound traffic control 146 may also collect and store statistics on connections between the service 160A and other services. The statistics may be stored in data store 148. In some embodiments, the statistics may be used to automatically determine, configure, and adjust networking management aspects such as timeouts, flow control, etc. for connections between the service 160A and other services. In some embodiments, the statistics may be sent to an HA service 150 of the HA framework 140 that may, for example, utilize machine learning or other technologies to determine the networking management aspects for the service 160A based at least in part on the statistics.

Figure 3:
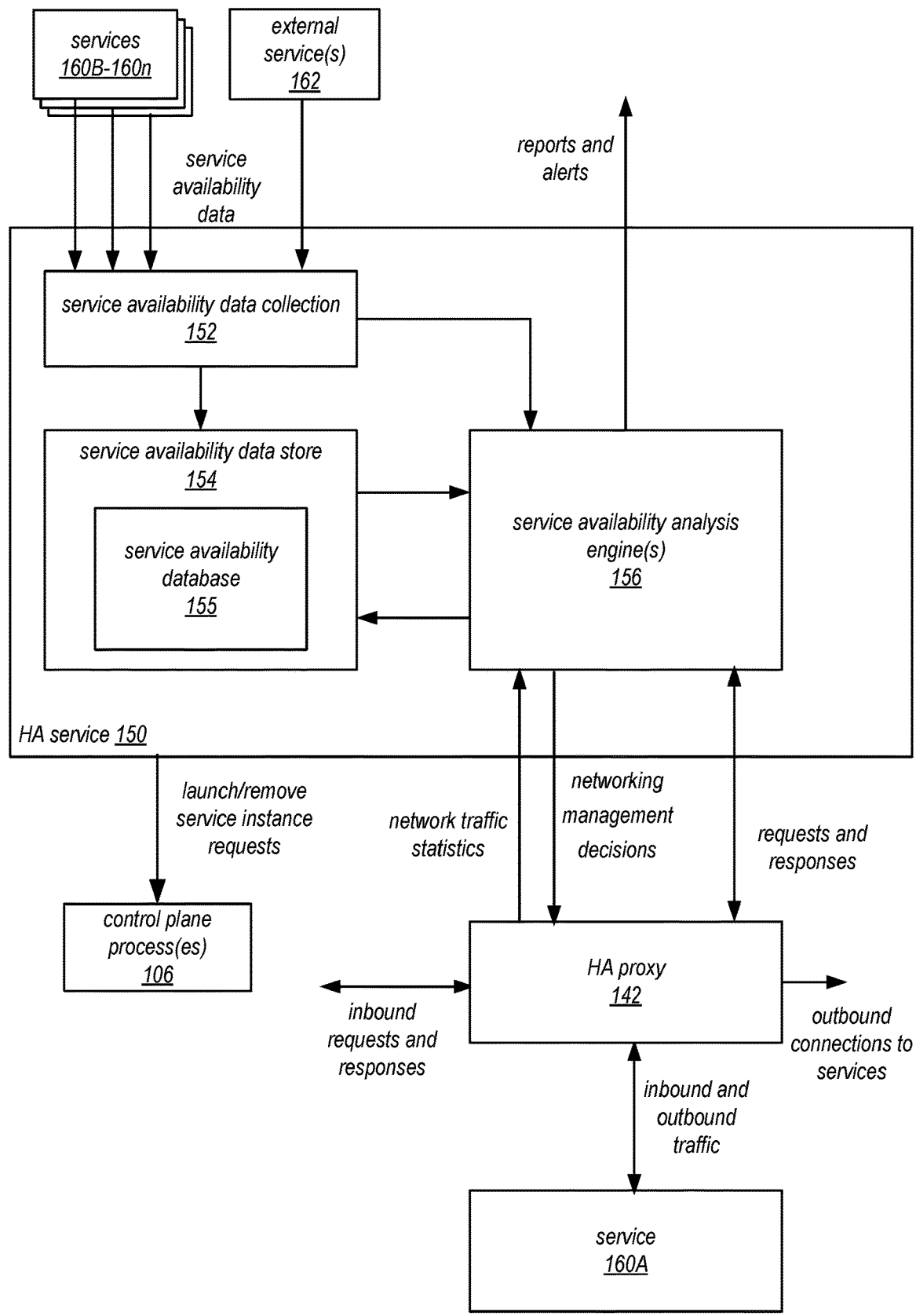
FIG. 3 is a block diagram illustrating components and operations of an HA service, according to some embodiments.

FIG. 3 is a block diagram illustrating components and operations of an HA service 150 in an HA framework 140, according to some embodiments. HA service 150 may be implemented by one or more computing devices on the provider network 100. In some embodiments, the HA service 150 may include, but is not limited to, a service availability data collection 152 module, one or more service availability analysis engines 156, and a service availability data store 154. The HA service 150 may make decisions for HA proxies 142, or alternatively may provide information to the HA proxies 142 that may then make decisions based on the information.

HA service 150 may maintain a data structure (e.g., a database 155) of availability information for services, including services 160B-160n on the provider network and services 162 external to the provider network. For a given service 160 on the provider network (e.g., service 160A), the database 155 may include, but is not limited to, an initial or target availability level, an actual availability level, and a list of other services 160 or 162 that the service 160A connects to and depends upon for its functionality.

Data collection 152 may collect availability data for services, including services 160 on the provider network and services 162 external to the provider network, for example via an API to the HA service 150, and may provide the data to analysis engine(s) 156 and/or store the data to the database 155. The availability data for a service 160 on the provider network may include an initial availability level expectation for the service 160, for example provided by the service developer via an API when deploying the service 160. For example, a service developer may expect that their service 160 will be available 99.9999% of the time ("six nines"). The availability data for a service 160 may also include information indicating dependencies of the service 160, for example a list of other services 160 that the service 160 can connect to and communicate with. The availability data may also include data collected from deployed services 160, for example data collected over time indicating actual uptime and/or downtime statistics for the services 160 once deployed on the provider network. The availability data for an external service 162 may include one or more of, but is not limited to, data collected over time indicating actual uptime and/or downtime statistics for the services 162, and availability level expectations or ratings for the services 162 (e.g., "six nines"). In some embodiments, a service 160 on the provider network or an external service 162 may simply be rated as "HA" or "not HA".

Analysis engine(s) 156 may obtain availability data for services from database 155 and/or from data collection 152 module, and may also obtain data from HA proxies 142. For example, analysis engine(s) 156 may obtain data from an HA proxy 142 indicating that a service 160A has connected to another service 160 or 162. Analysis engine(s) 156 may analyze the obtained data to estimate actual availability levels of the services, and may adjust the availability levels of the services based on the analysis. Analysis engine(s) 156 may also write data to or update data in the database. For example, upon determining from an analysis that the actual availability level of a service is lower than its current availability level in the database 155, an analysis engine 156 may update the availability level of the service in the database 155. As another example, upon determining from information received from proxy 142 that service 160A has connected to another service that is not recorded in the database 155, the analysis engine may record the other service as a dependency for the service 160A in the database 155.

For example, an analysis engine 156 may analyze data collected over time indicating actual uptime and/or downtime statistics for a service 160 on the provider network, and may downgrade the service 160's availability level upon determining that the service 160 has experienced more downtime than predicted by its current availability level. As an example, if a service 160 has an initial availability of 99.9999 ("six nines"), indicating that the service should only be down for 31.5 seconds per year, and the analysis engine (s) 156 detect that the service 160 has experienced five minutes of downtime in the last year, then the analysis engine 156 may downgrade the service 160 to an availability level of 99.999 ("five nines").

As another example, an analysis engine 156 may determine the availability level of a service 160 on the provider network based at least in part on an availability level for one or more other services that the service 160 directly or indirectly connects to. The analysis engine 156 may analyze the availability levels of one or more services to which a service 160 connects (as well as other services that those services connect to), and may downgrade the service 160's availability level upon determining that the service 160 has a dependency on another service that has a lower availability level than the service 160. As an example, if a service 160 has an initial availability of 99.9999 ("six nines"), indicating that the service 160 should only be down for 31.5 seconds per year, and the analysis engine 156 detect that the service 160 has a dependency on another service with an availability level of 99.999 ("five nines"), then the analysis engine 156 may downgrade the service 160 to an availability level of 99.999 ("five nines"). Since a service 160 may depend on another service that has dependencies on one or more other services, and so on, this analysis may be performed recursively, and the service 160's actual availability level may be no higher than the lowest availability level of any of the services in its dependency chain.

As another example, an analysis engine 156 may receive data from an HA proxy 142 indicating that service 160A has connected to another service. The analysis engine 156 may check the availability level of the other service and, if its availability level is lower than the availability level of service 160A, the analysis engine 156 may downgrade the availability level of service 160A.

Analysis engine(s) 156 may also receive queries from HA proxies 142 requesting information or decisions regarding connection requests. For example, service 160A may send a connection request to another service 160 or 162. HA proxy 142 may intercept the request, and query the HA service 150 for information regarding the other service, or to request a decision on whether the other service meets the HA requirements of service 160A. An analysis engine 156 may look up the other service in the database 155 and return its availability level to the proxy 142, which may then determine an appropriate action, for example whether the connection should be allowed or disallowed, or allowed with an alert or warning. Alternatively, the analysis engine 156 may look up the other service in the database 155 and determine an appropriate action based on its availability level and the HA requirements of service 160A, for example whether the connection should be allowed or disallowed, or allowed with an alert or warning, and return its decision to the proxy 142.

In some embodiments, if the other service is not in a list of services that service 160A is allowed to connect to, or is in a list of services that service 160A is not allowed to connect to, the connection may be disallowed, or may be allowed with an alert or warning. In some embodiments, the service developer 190 may provide a list of services that the service 160A is allowed to connect to, and/or a list of services that the service 160A is not allowed to connect to (or, alternatively, one list that indicates allowed and disallowed services). In some embodiments, the service 160A is allowed to connect to services on the "allowed" list regardless of the services' availability ratings or levels, and is not allowed to connect to services on the "disallowed" list regardless of the services' availability ratings or levels.

In some embodiments, the alerts or warnings may be provided to the owner of a service 160 (e.g., service 160A), for example to the service developer 190 via an API to HA service 150. In some embodiments, the service owner may be allowed to make a decision via the API on whether to allow or disallow a connection request that violates the HA requirements of the service 160A, or to take some other action in response to an alert or warning.

HA service 150 may also generate reports or otherwise provide information about a service 160's availability level. For example, the HA service 150 may report service 160A's current availability level, or a change in service 160A's availability level, to the service owner/service developer 190 via the API to HA service 150. As another example, the HA service 150 may provide a list or hierarchy of services that service 160 depends on, along with other services that those services depend on, and so on, and may also provide the availability levels (updated when necessary) for the services on the list.

In some embodiments, HA service 150 may also receive network traffic statistics from HA proxy 142. The statistics may be stored to data store 154. An analysis engine 156 may analyze the statistics collected over a period of time using machine learning or other technologies to determine networking management aspects such as timeouts, flow control, etc. for the inbound and/or outbound connections to the service 160A. The networking management decisions may then be provided to the HA proxy 142, which may then adjust inbound and outbound network traffic control (e.g., flow, timeouts, number of connections, etc.) according to the decisions.

In some embodiments, multiple instances of a service 160A may be launched on the provider network from its MI or container, and workload for the service 160A may be spread across the instances, for example by a load balancer frontend. In some embodiments, HA service 150 may analyze network traffic statistics collected for a service 160A instance or instances to determine whether additional instances of service 160A need to be launched, or whether one or more instances of service 160A can be removed. For example, HA service 150 may determine from analysis of the statistics that a service 160A instance is not responding to inbound requests in a timely manner, and in response may message a control plane process 106 to launch one or more new instances of service 160A on the provider network from its MI or container. As another example, HA service 150 may determine from analysis of the statistics that one or more service 160A instances are mostly idle, and in response may message a control plane process 106 to remove at least one instance of service 160A from the provider network.

Figure 4:
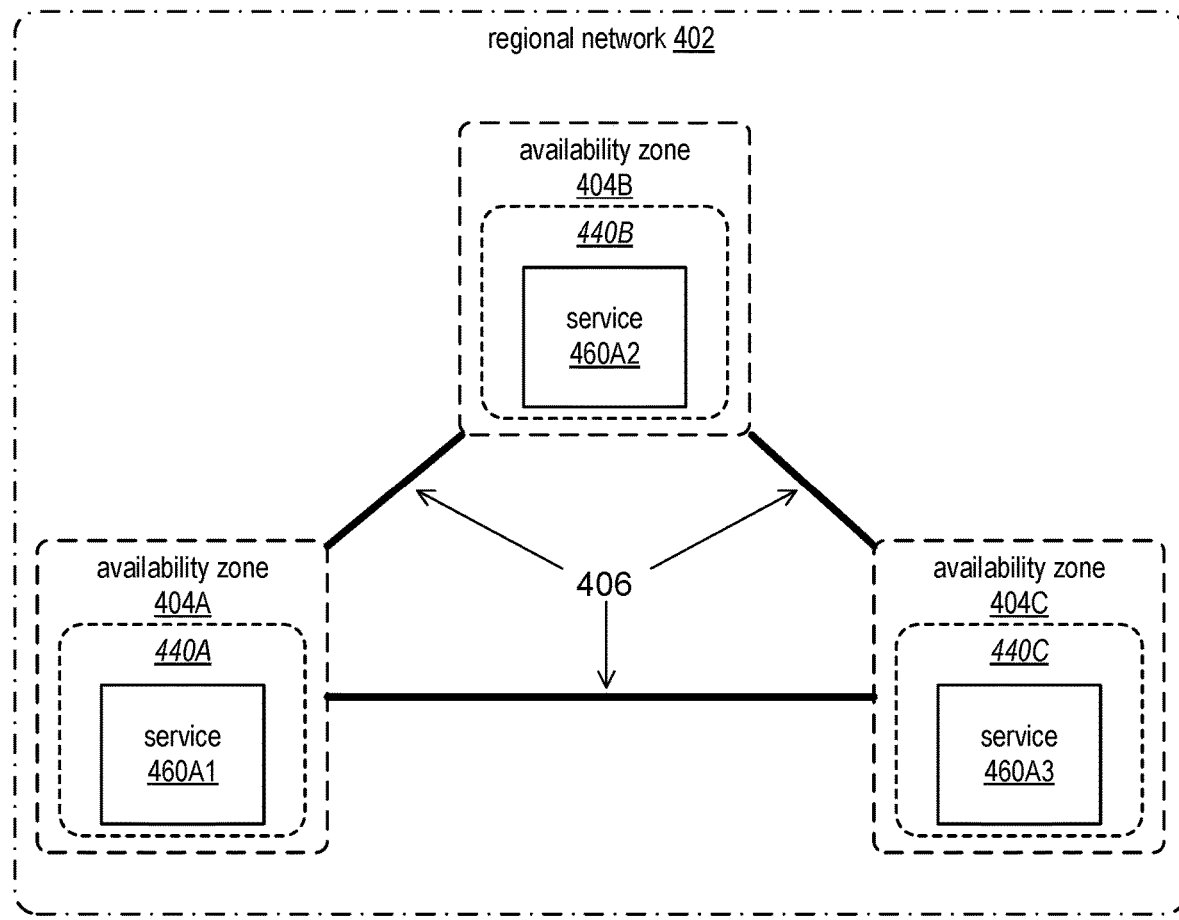
FIG. 4 illustrates services distributed across availability zones of a provider network, according to some embodiments.

FIG. 4 illustrates a service 460A replicated across availability zones of a provider network, according to some embodiments. In some embodiments, a provider network may include one or more regional networks 402; a regional network 402 may include multiple availability zones 404, for example availability zones 404A, 404B, and 404C as shown in FIG. 4. Each availability zone 404 may correspond to or be implemented by one or more data centers within the respective regional network 402; a data center may implement one or more availability zones 404. The availability zones 404A-404C in a regional network 402 may be connected through high-bandwidth, low-latency links 406 (e.g., dedicated high-bandwidth fiber-optic links) and collectively form the regional network 402. Communications between endpoints in different availability zones 404 within regional network 402 may go over an intermediate network such as the Internet or over the low-latency links 406.

In some embodiments, provider network services may provide replication of a service 460A across the availability zones 404A-404C of a regional network 402. By replicating service 460A across the availability zones 404A-404C, the service 460A may remain available in at least one other availability zone 404 in the regional network 402 if one availability zone 404 goes down for some reason. For example, if availability zone 404A and/or service 460A1 goes down or becomes unavailable for some reason, the replicated service 460A2 and 460A3 in zones 404B and 404C may still be available.

An important aspect of availability zones 404 is maintaining availability zone independence—if one availability zone 404 goes down, the other availability zones 404 (and replicated services within those availability zones 404) should not go down or be adversely affected as a result. However, replicated services may sometimes share data between availability zones 404, for example via low-latency links 406 between the availability zones 404. As shown in FIG. 4, the HR framework 440 may be implemented in each of the availability zones 404A-404C of the regional network 402, and the replicated service 460A may be wrapped in the HR framework 440 in each zone 404. By monitoring and controlling all inbound and outbound traffic to the service 460A replica in each zone 404, the HA framework 440 may serve as a buffer between the service 460A replicas (460A1, 460A2, and 460A3) in the different availability zones 404, and may help to maintain independence of the service 460A replicas in the different availability zones 404, thus helping to ensure that if one availability zone 404 goes down, the service 460A does not go down and is not adversely affected in the other availability zones 404, thus maintaining the availability of the service 460A.

In some embodiments, the HA service 150 as illustrated in FIG. 3 may be replicated in the availability zones 404. The HA service 150 in each zone may collect information about data exchanges between service 460A replicas in the zones 404 from HA proxies 142 in the zones 404, and may store at least some of the information to data store 154. Reports or alerts about the data exchanges between zones 404 may be provided to the service owner via APIs to the HA service 150 replicas. In some embodiments, the service owner may be requested to allow or disallow at least some connections between the service 460A replicas in the zones 404.

Figure 5:
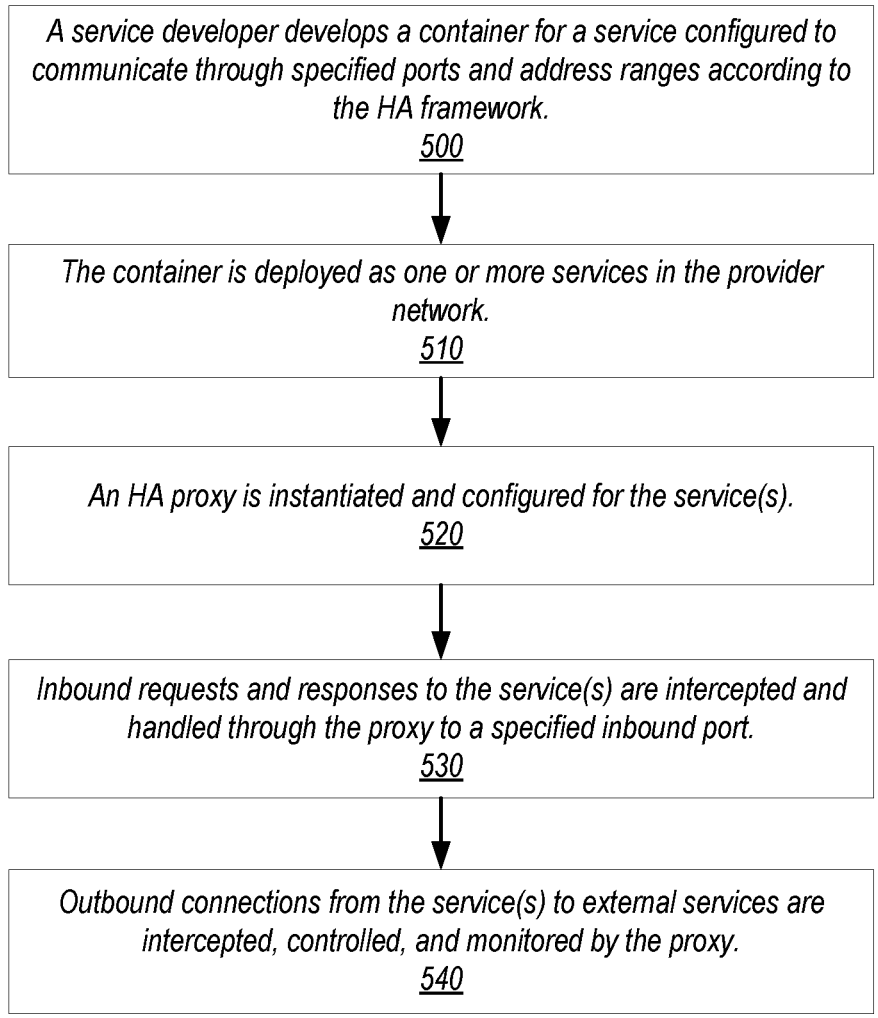
FIG. 5 is a high-level flowchart of a method for deploying services in an HA framework, according to some embodiments.
Figure 6:
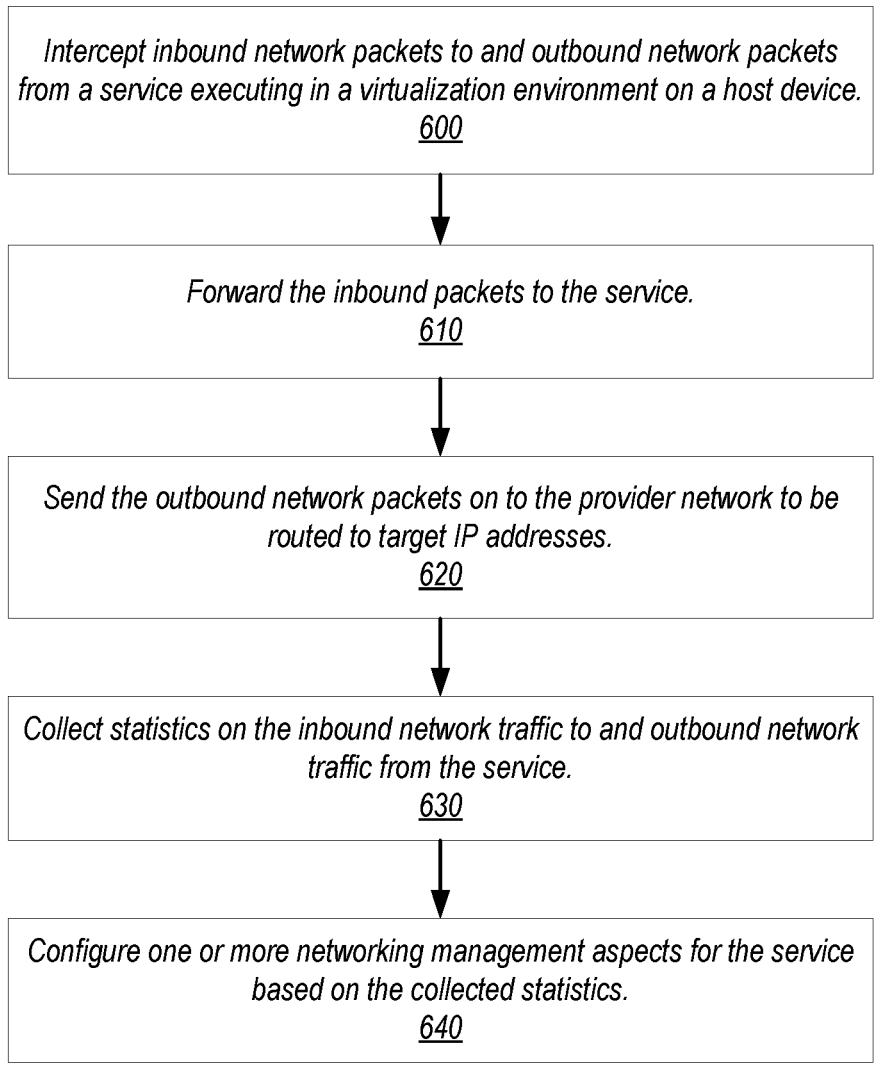
FIG. 6 is a high-level flowchart of a method for managing network traffic for a service in an HA framework, according to some embodiments.
Figure 7:
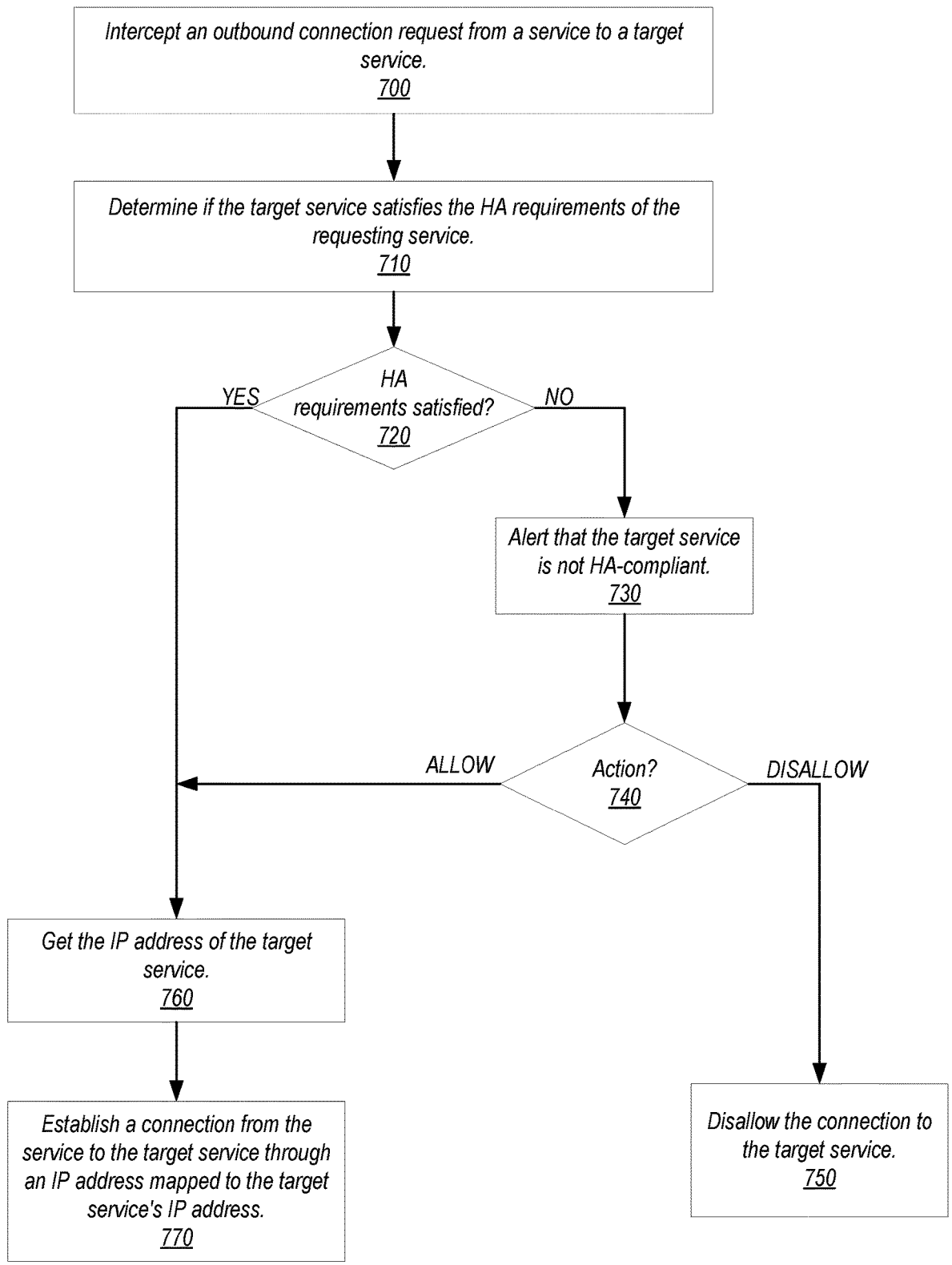
FIG. 7 is a flowchart of a method for controlling outbound connections from a services in an HA framework, according to some embodiments.

FIG. 5 is a high-level flowchart of a method for deploying services in an HA framework, according to some embodiments. As indicated at 500, a service developer develops a container (or a machine image) for a service configured to communicate through specified ports and address ranges according to the HA framework. As indicated at 510, the container is deployed as one or more services to the HA framework in the provider network. As indicated at 520, an HA proxy is instantiated and configured for the service(s). As indicated at 530, inbound requests and responses to the service(s) are intercepted and handled through the HA proxy to a specified inbound port. As indicated at 540, outbound connections from the service(s) to target services are intercepted, controlled, and monitored by the proxy, for example using a method as illustrated in FIGS. 6 and 7. The container is configured to request connections to other services via domain name lookup requests. The HA framework intercepts all connection requests and resolves the domain name lookups (and makes allow/disallow connection decisions based on the HA requirements of the service). Thus, the container does not "know" that it is participating in the HA framework, and can be launched in other environments (e.g., in test environments) and still function without modifying the container.

FIG. 6 is a high-level flowchart of a method for managing network traffic for a service in an HA framework, according to some embodiments. As indicated at 600, an HA proxy may intercept inbound network packets to and outbound network packets from a service executing in a virtualization environment on a host device. As indicated at 610, the HA proxy may forward the inbound packets to the service. As indicated at 620, the HA proxy may determine target IP addresses for the outbound network packets and send the outbound network packets on to the provider network to be routed to the target IP addresses. As indicated at 630, the HA proxy may collect statistics on the inbound network traffic to and outbound network traffic from the service. As indicated at 640, the HA proxy may configure one or more networking management aspects (e.g., flow control, timeouts, etc.) for the service based on the collected statistics. In some embodiments, the collected statistics may be sent to an HA service of the HA framework as illustrated in FIG. 3 that may, for example, utilize machine learning or other technologies to determine the networking management aspects for the service.

In some embodiments, multiple instances of a service may be launched on the provider network from its MI or container, and workload for the service may be spread across the instances, for example by a load balancer frontend. In some embodiments, the HA framework may analyze the statistics collected for a service instance or instances to determine whether additional instances of the service need to be launched, or whether one or more instances of the service can be removed. For example, the HA service may determine from analysis of the statistics that a service instance is not responding to inbound requests in a timely manner, and in response may message a control plane process to launch one or more new instances of the service on the provider network from its MI or container. As another example, the HA service may determine from analysis of the statistics that one or more service instances are mostly idle, and in response may message a control plane process to remove at least one instance of the service from the provider network.

FIG. 7 is a flowchart of a method for controlling outbound connections from a services in an HA framework, according to some embodiments. As indicated at 700, an HA proxy intercepts an outbound connection request from a service to a target service. As indicated at 710, the HA proxy determines if the target service satisfies the HA requirements of the requesting service. At 720, if the target service satisfies the HA requirements of the requesting service, then the HA proxy obtains the IP address of the target service as indicated at 760, and establishes a connection from the service to the target service through an IP address mapped to the target service's IP address as indicated at 770. At 720, if the target service does not satisfy the HA requirements of the requesting service, then the HA proxy generate an alert that the target service is not HA-compliant. At 740, the HA proxy may then determine what action to take, for example based on specified preferences of the service developer. For example, the specified preferences may indicate that a connection to a target service that is not HA-compliant is to always be allowed, or always be disallowed. As another example, the specified preferences may indicate that the service developer is to be alerted when a connection to a target service that is not HA-compliant is requested, and that the service developer will make the decision on whether to allow or disallow the connection. If the HA service determines that the connection should be allowed, then the method goes to element 760, where the HA proxy obtains the IP address of the target service and establishes a connection from the service to the target service through an IP address mapped to the target service's IP address as indicated at 770. If the HA service determines that the connection should not be allowed, then the HA proxy disallows the connection to the target service as indicated at 750.

Redundant Services

Figure 8:
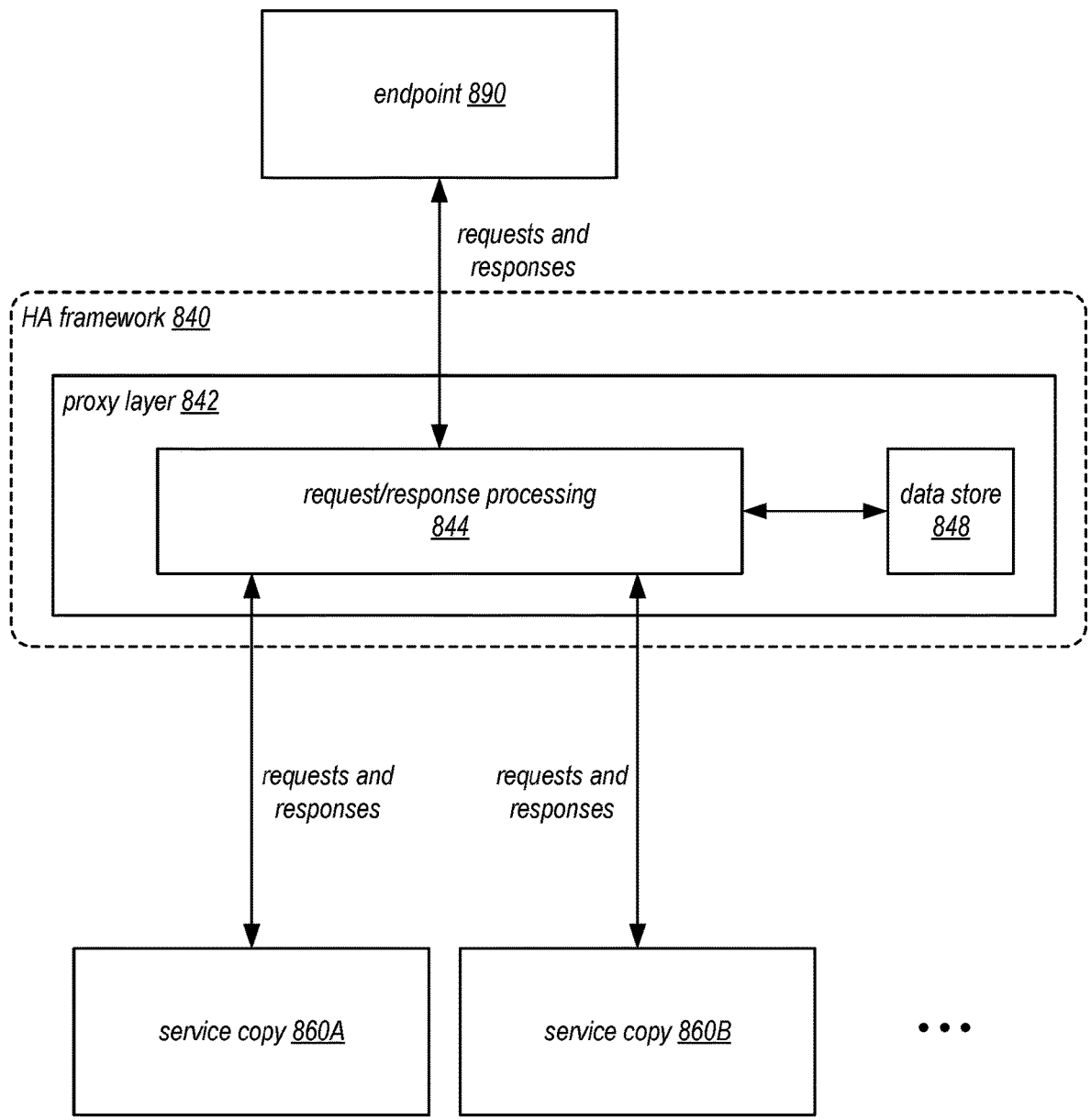
FIG. 8 illustrates redundant services supported by an HA framework, according to some embodiments.

In some embodiments, the HA framework described in reference to FIGS. 1 through 8 may be used to implement redundant services, for example as illustrated in FIG. 8. The proxy layer 842 of the HA framework 840 may include one or more modules 844 that intercept and process all inbound and outbound network requests and responses to a service 860 deployed as a container on a host device. In some embodiments, the proxy layer 842 may record the requests and responses, for example to a data store 848. The HA framework 844 may leverage this functionality to provide redundancy by enabling the same request to be safely processed on two or more copies or instances of a service 860 launched from the service 860's container or MI (e.g., service copies 860A and 860B). If one of the copies 860 fails while the request is being processed, another copy 860 can complete the request. Conventionally, this redundancy is difficult to implement because of potential side effects. For example, two copies of a service may both withdraw money, cause an email to get sent, or write a database record when processing the same request. However, the functionality of the proxy layer may be leveraged to prevent the side effects, thus allowing the same request to be safely processed on redundant services 860.

In some embodiments, to enable redundant services, the HA framework 840 intercepts and processes network requests and also records the results. In addition, in some embodiments, every request is handled by new copies 860 of the container.

As an example, a request from an endpoint 890 may simultaneously be sent by proxy layer 842 to service copy 860A and service copy 860B (each a fresh copy of the container), and both service copies 860 may start processing the request. At any time that service copy 860A tries to access the network, the framework 840 determines whether service copy 860B has already completed the request. If service copy 860B has completed the request, then service copy 860A is sent a copy of the response that service copy 860B already received (and that was recorded by the framework 840). In some embodiments, the framework 840 may block service copy 860A if necessary. If service copy 860A completes the request before service copy 860B, then the opposite happens. If one of the service copies 860 goes down, then the other service copy 860 completes the request. This method may be extended to include more than two redundant service copies 860.

Example Provider Network Environment

This section describes example provider network environments in which embodiments of the methods and apparatus described in reference to FIGS. 1 through 8 may be implemented. However, these example provider network environments are not intended to be limiting.

Figure 9:
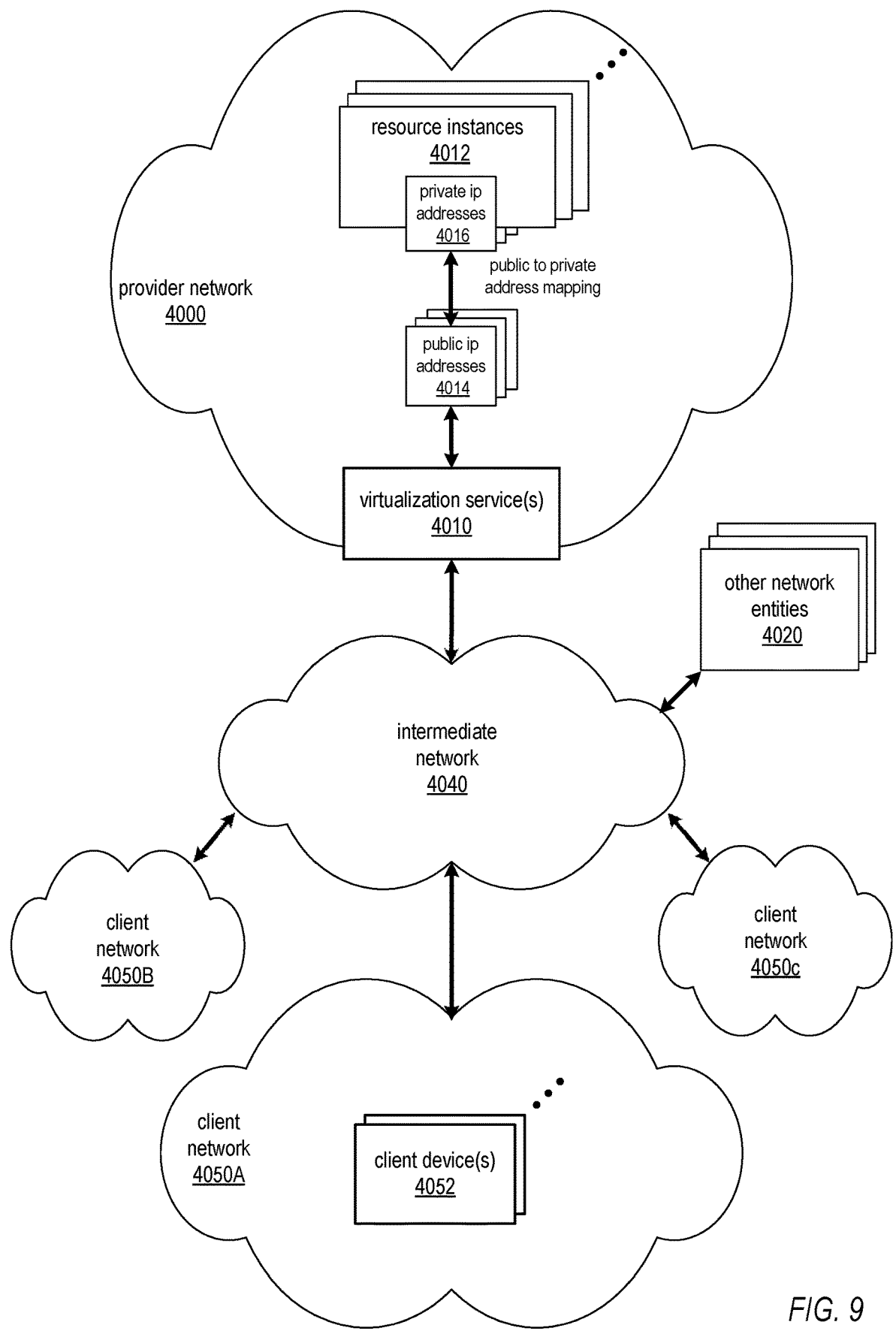
FIG. 9 illustrates an example provider network environment, according to some embodiments.

FIG. 9 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 10:
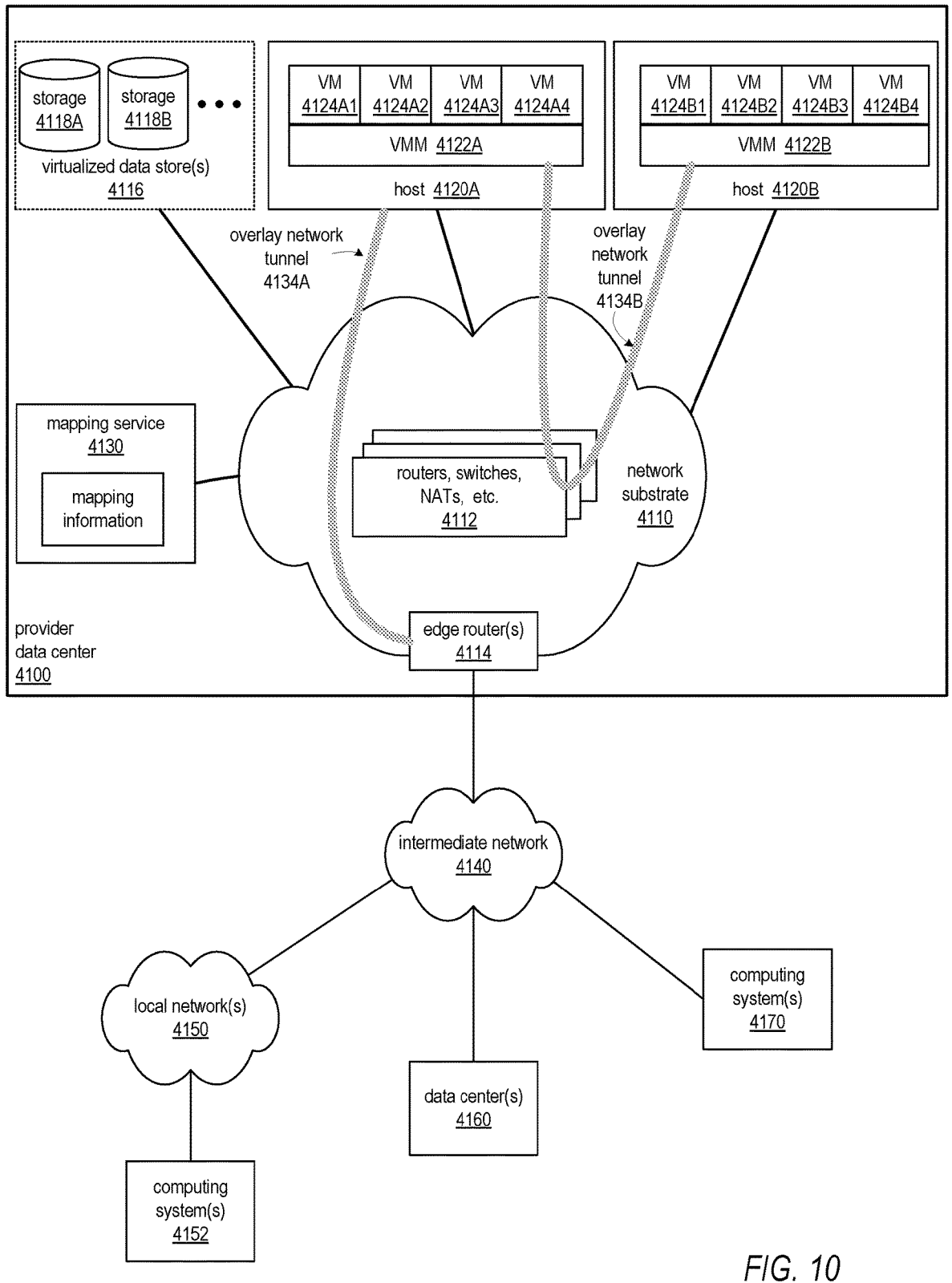
FIG. 10 illustrates an example data center that implements an overlay network on a network substrate using IP tunneling technology, according to some embodiments.

FIG. 10 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 10) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 10, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 10, at least some networks in which embodiments may be implemented may include hardware virtualization technology that enables multiple operating systems to run concurrently on a host computer (e.g., hosts 4120A and 4120B of FIG. 10), i.e. as virtual machines (VMs) 4124 on the hosts 4120. The VMs 4124 may, for example, be executed in slots on the hosts 4120 that are rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 10 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to clients of the network provider, the hardware virtualization technology may also be used to provide other computing resources, for example storage resources 4118, as virtualized resources to clients of a network provider in a similar manner.

Figure 11:
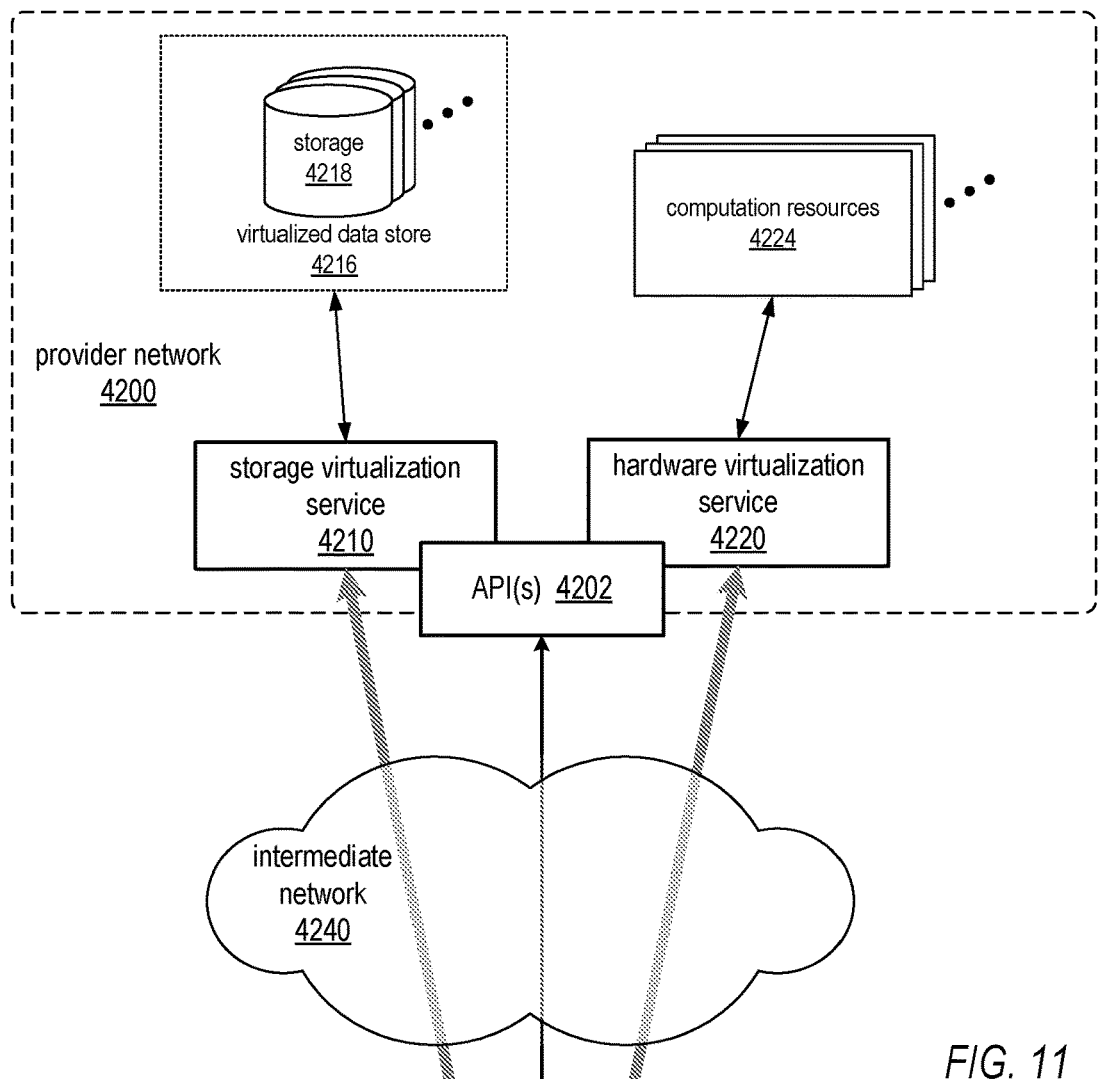
FIG. 11 is a block diagram of an example provider network that provides a storage virtualization service and a hardware virtualization service to clients, according to some embodiments.
Figure 11:
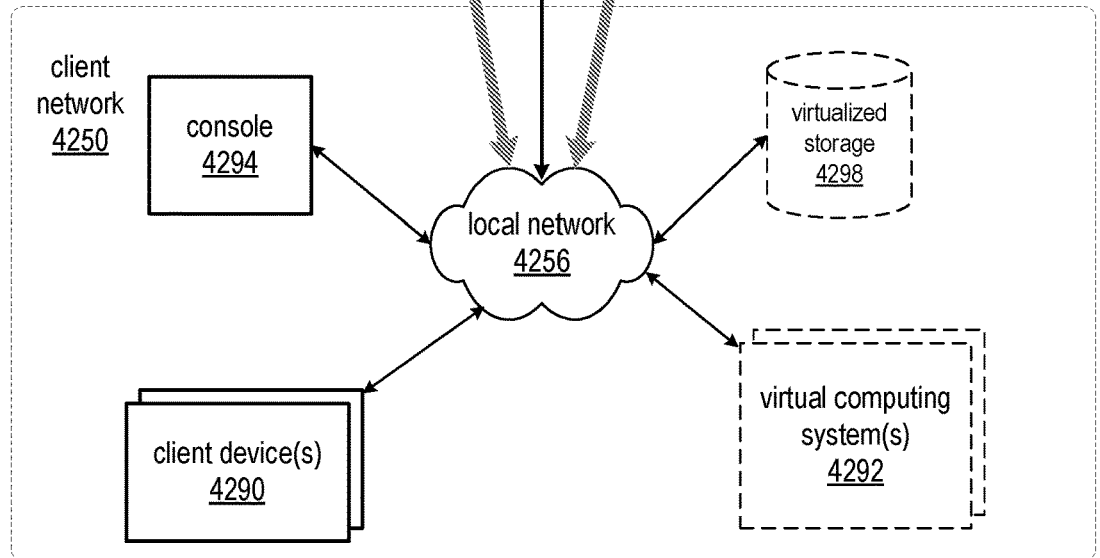

FIG. 11 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 11, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 12:
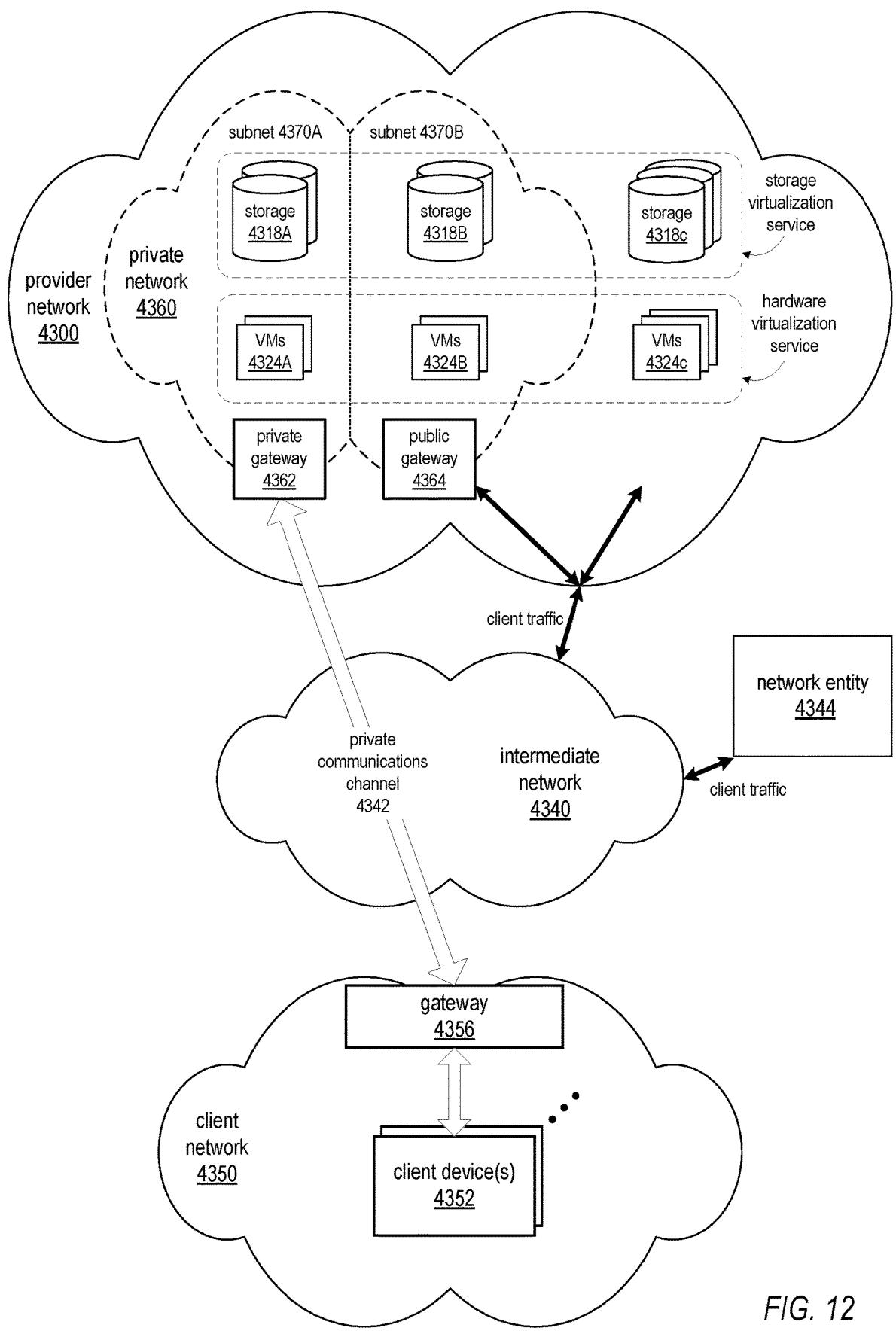
FIG. 12 illustrates an example provider network that provides virtual networks to at least some clients, according to some embodiments.

FIG. 12 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 12 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 12 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

In some embodiments, a system that implements a portion or all of the methods and apparatus for providing a high-availability (HA) framework for services in provider network environments as described herein may include a general-purpose computer system that includes or is configured to access one or more computer-accessible media, such as computer system 5000 illustrated in FIG. 13. In the illustrated embodiment, computer system 5000 includes one or more processors 5010 coupled to a system memory 5020 via an input/output (I/O) interface 5030. Computer system 5000 further includes a network interface 5040 coupled to I/O interface 5030. While FIG. 13 shows computer system 5000 as a single computing device, in various embodiments a computer system 5000 may include one computing device or any number of computing devices configured to work together as a single computer system 5000.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 12, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 8 for providing a high-availability (HA) framework for services in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of methods may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A method, comprising:
performing, by a high-availability (HA) proxy executing on a device in a provider network:
receiving, from a service executing in a virtualization environment on a host device in the provider network, a connection request to establish a connection to a target service;
determining, in response to the connection request, whether the target service satisfies high-availability (HA) requirements of the requesting service; and
upon determining that the target service satisfies the HA requirements of the requesting service, establishing the requested connection from the service to the target service.
2. The method as recited in claim 1, further comprising, upon determining that the target service does not satisfy the HA requirements of the requesting service:
determining whether the connection is allowed or disallowed; and upon determining that the connection is allowed, establishing a connection from the service to the target service.

3. The method as recited in claim 1, further comprising, upon determining that the target service does not satisfy the HA requirements, generating an alert indicating that the target service does not satisfy the HA requirements of the requesting service.

4. The method as recited in claim 1, wherein the HA requirements of the requesting service include a target availability level indicating a percentage of time over a period that the service should be available.

5. The method as recited in claim 4, wherein determining whether the target service satisfies the HA requirements of the requesting service comprises:
   determining an availability level for the target service, wherein the availability level indicates a percentage of time over a period that the target service should be available;
   determining that the target service satisfies the HA requirements of the requesting service if the availability level for the target service is at or above the target availability level of the service; and
   determining that the target service does not satisfy the HA requirements of the requesting service if the availability level for the target service is below the target availability level of the service.

6. The method as recited in claim 5, wherein determining the availability level for the target service comprises determining the availability level of the target service based at least in part on availability levels for one or more other services that the target service directly or indirectly connects to.

7. The method as recited in claim 5, wherein determining the availability level for the target service comprises the HA proxy querying an HA service executing on one or more devices on the provider network requesting the availability level for the target service, wherein the HA service tracks availability levels of services on the provider network.

8. The method as recited in claim 1, wherein determining whether the target service satisfies the HA requirements of the requesting service comprises determining whether the target service is on a list of one or more other services that the service is allowed to communicate with or on a list of one or more other services that the service is not allowed to communicate with.

9. The method as recited in claim 1, further comprising:
   collecting statistics on inbound network traffic to and outbound network traffic from the service; and
   causing one or more additional instances of the service to be launched on the provider network based on analysis of the collected statistics.

10. The method as recited in claim 9, further comprising:
    sending, by the HA proxy, the collected statistics to an HA service executing on one or more devices on the provider network; and
    analyzing, by the HA service, the statistics collected over a period of time to determine configurations for one or more networking management aspects for the service, wherein the networking management aspects for the service include one or more of:
       flow control for network connections between the service and external endpoints, or
       timeouts on the network connections between the service and the external endpoints.

11. The method as recited in claim 10, wherein the HA service applies machine learning technology to analyze the statistics.

12. A non-transitory computer-readable storage medium storing program instructions that when executed on a computing device cause the computing device to:
    receive, from a service executing in a virtualization environment on a host device in a provider network, connection requests to establish connections to target services;
    determine whether the target services satisfy high-availability (HA) requirements of the requesting service, wherein the HA requirements of the requesting service include a target availability level indicating a percentage of time over a period that the service should be available; and
    upon determining that a target service of the target services satisfies the HA requirements of the requesting service, establishing the requested connection from the service to the target service; and
    upon determining that another target service of the target services does not satisfy the HA requirements of the requesting service:
       determine whether the requested connection is allowed or disallowed; and
       upon determining that the requested connection is allowed, establish the requested connection from the service to the other target service.

13. The non-transitory computer-readable storage medium as recited in claim 12, wherein, to determine whether a target services satisfies the HA requirements of the requesting service, the program instructions when executed on the computing device cause the computing device to:
    determine an availability level for the target service based at least in part on availability levels for one or more other services that the target service directly or indirectly connects to, wherein the availability level indicates a percentage of time over a period that the target service should be available;
    determine that the target service satisfies the HA requirements of the requesting service if the availability level for the target service is at or above the target availability level of the service; and
    determine that the target service does not satisfy the HA requirements of the requesting service if the availability level for the target service is below the target availability level of the service.

14. The non-transitory computer-readable storage medium as recited in claim 12, the program instructions when executed on the computing device cause the computing device to:
    collect statistics on inbound network traffic to and outbound network traffic from the service; and
    determine one or more networking management aspects for the service based at least in part on the collected statistics, wherein the networking management aspects for the service include one or more of:
       flow control for network connections between the service and external endpoints; or
       timeouts on the network connections between the service and the external endpoints.

15. A system, comprising:
    a device on a provider network, the device including a processor coupled to a memory, the memory including instructions for a high-availability (HA) proxy that upon execution cause the device to:

receive, from a service executing in a virtualization environment on a host device in the provider network, a connection request to establish a connection to a target service;

determine, in response to the connection request, whether the target service satisfies high-availability (HA) requirements of the requesting service; and upon determining that the target service satisfies the HA requirements of the requesting service, establish the requested connection from the service to the target service.

16. The system as recited in claim 15, wherein the instructions upon execution further cause the device to, upon determining that the target service does not satisfy the HA requirements of the requesting service:

determine whether the connection is allowed or disallowed; and upon determining that the connection is allowed, establish a connection from the service to the target service.

17. The system as recited in claim 15, wherein the instructions upon execution further cause the device to, upon determining that the target service does not satisfy the HA requirements, generate an alert indicating that the target service does not satisfy the HA requirements of the requesting service.

18. The system as recited in claim 15, wherein high-availability (HA) requirements of the requesting service include a target availability level indicating a percentage of time over a period that the service should be available, and wherein the instructions upon execution further cause the device to:

determine an availability level for the target service, wherein the availability level indicates a percentage of time over a period that the target service should be available;

determine that the target service satisfies the HA requirements of the requesting service if the availability level for the target service is at or above the target availability level of the service; and determine that the target service does not satisfy the HA requirements of the requesting service if the availability level for the target service is below the target availability level of the service.

19. The system as recited in claim 18, wherein, to determine the availability level for the target service, the instructions upon execution further cause the device to determine the availability level of the target service based at least in part on availability levels for one or more other services that the target service directly or indirectly connects to.

20. The system as recited in claim 18, wherein, to determine the availability level for the target service, the instructions upon execution further cause the device to query an HA service executing on one or more devices on the provider network requesting the availability level for the target service, wherein the HA service tracks availability levels of services on the provider network.

* * * * *